(12) United States Patent
Quinesser

(10) Patent No.: US 11,744,407 B2
(45) Date of Patent: Sep. 5, 2023

(54) FOOD PROCESSING APPARATUS AND SIEVE

(71) Applicant: KONINKLIJKE PHILIPS N.V., Eindhoven (NL)

(72) Inventor: Albert Quinesser, Klagenfurt (AT)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 601 days.

(21) Appl. No.: 16/619,654

(22) PCT Filed: Jun. 26, 2018

(86) PCT No.: PCT/EP2018/067023
§ 371 (c)(1),
(2) Date: Dec. 5, 2019

(87) PCT Pub. No.: WO2019/002242
PCT Pub. Date: Jan. 3, 2019

(65) Prior Publication Data
US 2020/0196800 A1 Jun. 25, 2020

(30) Foreign Application Priority Data
Jun. 30, 2017 (EP) .................................. 17178955

(51) Int. Cl.
*A47J 43/22* (2006.01)
*A47J 43/07* (2006.01)

(52) U.S. Cl.
CPC ........... *A47J 43/22* (2013.01); *A47J 43/0705* (2013.01)

(58) Field of Classification Search
CPC .............................. A47J 43/22; A47J 43/0705
(Continued)

(56) References Cited

U.S. PATENT DOCUMENTS

| 4,759,507 A | 7/1988 | Lynch |
| 5,607,062 A | 3/1997 | Poser |

(Continued)

FOREIGN PATENT DOCUMENTS

| CN | 103286061 A | 9/2013 |
| CN | 204505358 U | 7/2015 |

(Continued)

OTHER PUBLICATIONS

International Search Report and Written Opinion dated Oct. 1, 2018 for International Application No. PCT/EP2018/067023 Filed Jun. 26, 2018.

(Continued)

*Primary Examiner* — Marc C Howell
(74) *Attorney, Agent, or Firm* — Maschoff Brennan

(57) ABSTRACT

Described herein is a food processing apparatus (2) comprising: a container (4) having an interior; a sieve disposed within the interior of the container (4) and dividing the interior into a processing volume (14) and a collection volume (16); and a processing member (8) for processing food disposed within the processing volume. The sieve (7) comprises: a first separation member (10) comprising a set of first holes (32); and a second separation member (12) adjacent the first separation member and comprising a set of second holes (33) which are arranged such that they overlap the set of first holes to form a plurality of aligned openings (35) which pass through the first and second separation members (10, 12) for allowing food to pass from the processing volume (14) into the collection volume (16). The first and second separation members (10, 12) are movable relative to one other between a first position and a second position so as to vary the degree of overlap of the sets of first and second holes and to adjust the cross-sectional area of the aligned openings (35). Each aligned opening (35) is formed (Continued)

by two sides (82, 88) of one of the first holes (32) and either: one side of one of the second holes so as to define a triangular cross-sectional shape, or two sides (82', 88') of one of the second holes (33) so as to define a quadrilateral cross-sectional shape. In the second position, each aligned opening (35) is defined by portions of each of said sides (82, 88; 82', 88') of the first and second holes (32, 33) which are shorter than in the first position such that the aligned openings (35) have a smaller cross-sectional area when in the second position than the first position.

18 Claims, 10 Drawing Sheets

(58) Field of Classification Search
USPC .......................................................... 99/495
See application file for complete search history.

(56) References Cited

U.S. PATENT DOCUMENTS

| | | |
|---|---|---|
| 2001/0008258 A1 | 7/2001 | Robordosa |
| 2008/0223965 A1* | 9/2008 | Obersteiner ............ A47J 43/24 241/69 |

FOREIGN PATENT DOCUMENTS

| | | |
|---|---|---|
| EP | 3081127 | 10/2016 |
| WO | 2017/037233 | 3/2017 |

OTHER PUBLICATIONS

International Preliminary Report on Patentability dated Jul. 3, 2019, for International Application No. PCT/EP2018/067023 Filed Jun. 26, 2018.

* cited by examiner

FOOD PROCESSING APPARATUS AND SIEVE

CROSS REFERENCE TO RELATED APPLICATIONS

This application is the U.S. National Phase application under 35 U.S.C. § 371 of International Application No. PCT/EP2018/067023 filed Jun. 28, 2018, published as WO 2019/002242 on Jan. 3, 2019, which claims the benefit of European Patent Application Number 17178955.5 filed Jun. 30, 2017. These applications are hereby incorporated by reference herein.

FIELD OF THE INVENTION

The disclosure relates to a food processing apparatus and a sieve for a food processing apparatus.

BACKGROUND OF THE INVENTION

As well as separating solids from liquids, sieves can be used to separate small pieces of food from large pieces of food. For example, a bowl having a plurality of slits extending therethrough can be used to separate pieces of food that are small enough to pass through the slits from those that are not. However, the size of the pieces of food passing through the slits cannot be easily controlled.

It is therefore desirable to provide an improved sieve that overcomes this issues. US 2001/0008258 describes a device for chopping food containing a container body subdivided into an upper processing zone and a lower collecting zone. The rotary chopping tool received in the processing zone serves to comminute the food materials. A sieve is provided in the transition region from the processing zone to the collecting zone.

WO 2017/037233 describes a food processing apparatus comprising, when assembled, a collection bowl comprising an alignment portion on a bowl floor; a separation basket mounted in the collection bowl and comprising a lower central aperture facing the alignment portion; a drive unit comprising a power delivery interface; and a food processing assembly. The food processing assembly comprises a food processing member having a maximum diameter larger than the lower central aperture diameter within the separation basket and having a body comprising an engagement portion facing the alignment portion; and a shaft for engaging the food processing member with the power delivery interface, the shaft comprising an engagement member engaging with the alignment portion and having an upper portion extending through the lower central aperture towards the drive unit. The upper portion has a maximum diameter smaller than the lower central aperture diameter and is slidably engaged with the engagement portion.

EP 3 081 127 describes a device for comminuting food having a separate holder for a bearing of a comminuting tool. An insert can be realized in the form of two mutually movable elements. By means of corresponding engagement means, unintentional rotation of the insert elements relative to one another during the comminution process can be prevented.

U.S. Pat No. 4,759,507 describes a series of screens for use with a size reduction machine that have a tapered apertured wall formed into a frusto-conical shape, with an open wide end and a narrow closed end. All screens of a particular series have a cylindrical section, the same interior depth, outside diameter and angle of the tapered wall. A size reduction machine has means external to the machine providing for infinite adjustments to the gap. When an adjustment to the gap is required, the screen and impeller are removed from the machine and spacers are inserted onto the shaft.

U.S. Pat. No. 5,607,062 describes a screen module for a size reduction machine having a rigid screen with a tapered apertured wall formed in a frusto-conical shape. The rigid screen has an open wide end and a flat end. The wide end is mountable within a channel of the size reduction machine at a predetermined distance from a complementarily shaped impeller. The module has a fine screen nested within the rigid screen and against the tapered apertured wall. The fine screen has a wide end and a narrow end corresponding to the apertured wall. An adaptor disc is releasably secured within the rigid screen at the flat end. The adaptor has a tapered outer perimeter for seating against the tapered apertured wall when the adaptor disc is secured within the rigid screen, clamping the narrow end of the fine screen therebetween. A clamp ring is releasably secured at the open wide end of the rigid screen. The clamp ring has a tapered inner perimeter for seating against the tapered apertured wall when secured against the open wide end, clamping the wide end of the fine screen therebetween.

SUMMARY OF THE INVENTION

According to an aspect of the disclosure there is provided a food processing apparatus comprising: a container having an interior; a sieve disposed within the interior of the container and dividing the interior into a processing volume and a collection volume; and a processing member for processing food disposed within the processing volume. The sieve comprises: a first separation member comprising a set of first holes; and a second separation member adjacent the first separation member and comprising a set of second holes which are arranged such that they overlap the set of first holes to form a plurality of aligned openings which pass through the first and second separation members for allowing food to pass from the processing volume into the collection volume. The first and second separation members are movable relative to one other between a first position and a second position so as to vary the degree of overlap of the sets of first and second holes and to adjust the cross-sectional area of the aligned openings. Each aligned opening is formed by at least two sides of one of the first holes and at least one side of one of the second holes so as to define a polygonal cross-sectional shape. In the second position, each aligned opening is defined by portions of each of said sides of the first and second holes which are shorter than in the first position such that the aligned openings have a smaller cross-sectional area when in the second position than the first position.

The cross-sectional shape of each aligned opening may be geometrically similar in the first and second positions.

Each aligned opening may be formed by two sides of one of the first holes and either: one side of one of the second holes so as to define a triangular cross-sectional shape, or two sides of one of the second holes so as to define a quadrilateral cross-sectional shape.

The cross-sectional shape of each aligned opening, at least when in the second position, may comprise at least one intersection point formed by the intersection of two sides of the first and second holes partway along their length.

The intersecting sides of the first and second holes may be each angled away from a path of movement of the first hole relative to the second hole.

Each aligned opening may have a quadrilateral cross-sectional shape. Said two sides of the first hole may meet at a first vertex and said two sides of the second hole may meet at a second vertex, the first and second vertices lying on or parallel to a path of movement of the first hole relative to the second hole.

Each of the two sides of the first hole may intersect with each of the two sides of the second hole to form first and second intersection points.

A line drawn between the first and second intersection points may be perpendicular to a line drawn between the first and second vertices. The first and second intersection points may be spaced either side of the path of movement.

The width of the first holes may be greater than the spacing between adjacent second holes such that each first hole can bridge a pair of adjacent second holes to form a pair of aligned openings.

The first and/or second holes may be reflectionally symmetric about an axis of symmetry which is perpendicular to a path of movement of the first hole relative to the second hole.

The first and/or second holes may be reflectionally symmetric about an axis of symmetry which lies on a path of movement of the first hole relative to the second hole.

The first and second holes may have the same cross-sectional shape.

The first separation member and the second separation member may be bowl shaped. The first separation member and the second separation member may be rotatable relative to one another about an axis of rotation.

The first separation member and the second separation member may be rotatably coupled to one another at their centers.

The first and second separation members may be rotatably coupled via a snap-fit connection.

According to another aspect of the disclosure there is provided a sieve for a food processing apparatus, the sieve comprising: a first separation member comprising a set of first holes; and a second separation member adjacent the first separation member and comprising a set of second holes which are arranged such that they overlap the set of first holes to form a plurality of aligned openings which pass through the first and second separation members for allowing food to pass through the sieve. The first and second separation members are movable relative to one other between a first position and a second position so as to vary the degree of overlap of the sets of first and second holes and to adjust the cross-sectional area of the aligned openings. Each aligned opening is formed by two sides of one of the first holes and either: one side of one of the second holes so as to define a triangular cross-sectional shape, or two sides of one of the second holes so as to define a quadrilateral cross-sectional shape. In the second position, each aligned opening is defined by portions of each of said sides of the first and second holes which are shorter than in the first position such that the aligned openings have a smaller cross-sectional area when in the second position than the first position.

These and other aspects of the invention will be apparent from and elucidated with reference to the embodiments described hereinafter.

BRIEF DESCRIPTION OF THE DRAWINGS

For a better understanding of the disclosure and to show more clearly how it may be carried into effect, reference will now be made, by way of example, to the accompanying drawings, in which.

DETAILED DESCRIPTION OF EMBODIMENTS

Figure 1:
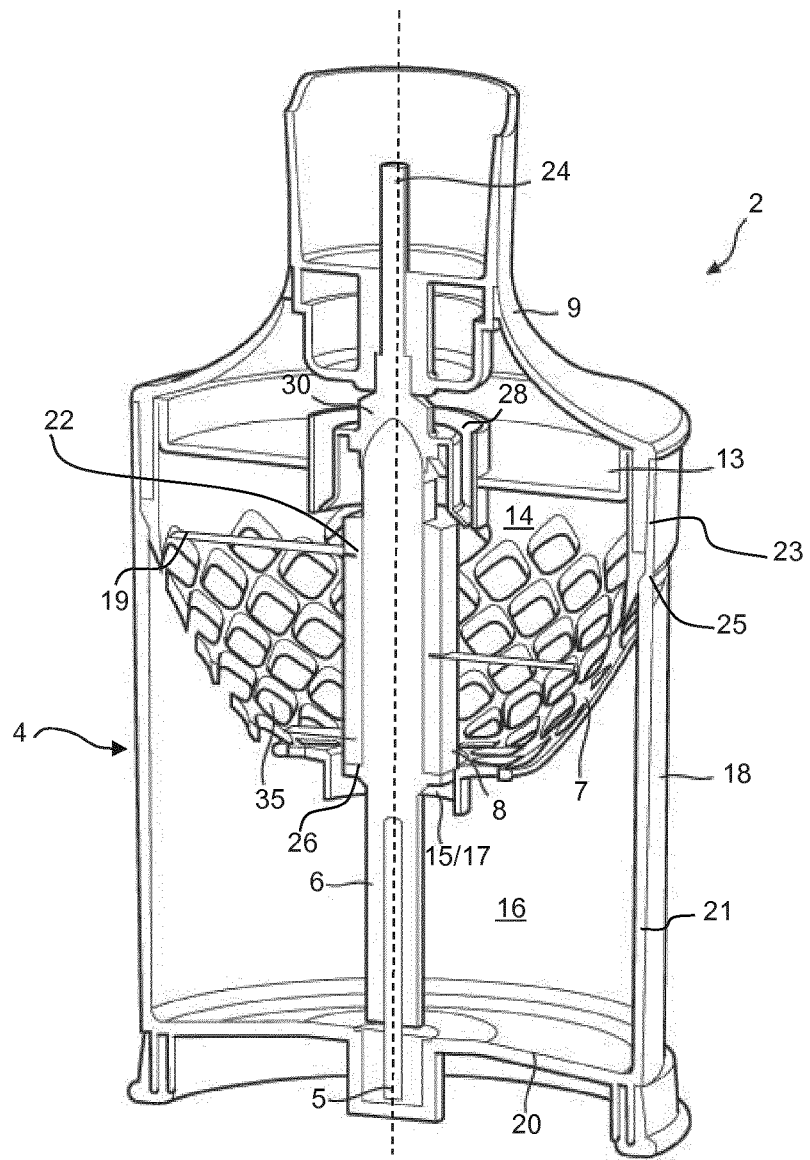
FIG. 1 shows a cross-sectional perspective view of a food processing apparatus.

FIG. 1 shows a food processing apparatus 2. The food processing apparatus 2 generally comprises a container 4, a separation basket 7 (or sieve), a shaft 6, a food processing member 8, a cover 13 and a drive unit 9.

The container 4 is generally cylindrical in shape and has a circular base 20 at its lower end and a cylindrical side wall 18 extending upwards from the circular base 20 and forming an opening 11 at its upper end. The cylindrical side wall 18 has a lower portion 21 and an upper portion 23. The wall of the upper portion 23 is thinner than the wall of the lower portion 21, and the cylindrical side wall 18 transitions between the lower portion 21 and the upper portion 23 at a ledge 25. The inner surface of upper portion 23 has a scalloped or wave-like (e.g. sinusoidal) profile when viewed from above. A bearing 5 is defined by a central portion of the base 20.

The separation basket 7 comprises a first basket member 10 and a second basket member 12. The first and second basket members 10, 12 are concave or bowl-shaped. The first basket member 10 is positioned above and nested within the second basket member 12. The first and second basket members 10, 12 are positioned centrally within the container 4 and divide the space defined by the container 4 into a processing volume 14 above the separation basket 7 and a collection volume 16 below the separation basket 7. The first basket member 10 and the second basket member 12 each have an opening 15, 17 formed at their center.

The shaft 6 comprises a substantially cylindrical rod, a lower portion of which is rotatably mounted within the bearing 5, such that it is free to rotate around a longitudinal axis 24 of the food processing apparatus 2. When assembled, an upper portion of the shaft 6 extends through the openings 15, 17 of the first and second basket members 10, 12.

The food processing member 8 comprises a plurality of blades 19 which project radially outwards from an engagement portion 22. The engagement portion 22 comprises an axial bore which receives and engages with an upper portion of the shaft 6. The shaft 6 comprises a shoulder 26 that supports the food processing member 8 from below, such that the food processing member 8 is maintained within the processing volume 14.

The cover 13 is substantially disc-shaped, and is positioned within an upper portion of the first basket member 10 so as to partially seal the processing volume 14. The cover 13 comprises a central opening 28 for receiving an upper end of the shaft 6.

The drive unit 9 is mounted to an upper end of the container 4. The drive unit 9 comprises a power delivery interface 30 which extends through the central opening 28 and engages with the upper end of the shaft 6. The drive unit 9 further comprises a motor (not shown) for rotating the power delivery interface 30. Rotation of the power delivery interface 30 results in rotation of the shaft 6, and thus the food processing member 8.

Figure 2:
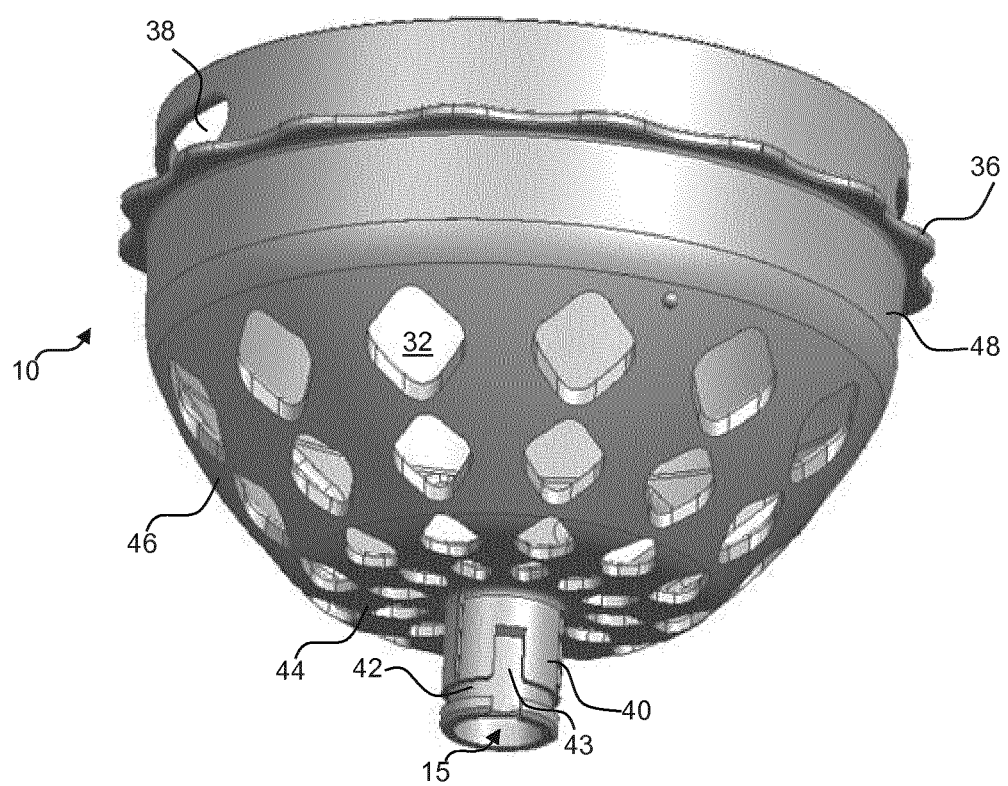
FIG. 2 shows a perspective view of a first basket member of a separation basket.

FIG. 2 shows the first basket member 10 in isolation. As mentioned above, the first basket member 10 is bowl-shaped. The first basket member 10 comprises a lower section 44, a middle section 46 and an upper section 48. The lower section 44 is generally planar, and extends horizontally. The upper section 48 is generally cylindrical, and extends vertically. The middle section 46 extends between the lower section 44 and the upper section 48, and has a generally frusto-conical profile which extends outwardly in an upward direction from the lower section 44 to the upper section 48.

The lower section 44 comprises a cylindrical protrusion 40 extending from an outer surface of the first basket member 10 at its center, in which the opening 15 is formed. The outer surface of the cylindrical protrusion 40 comprises a groove 42 which extends around the circumference of the protrusion 40. An additional groove 43 also extends axially along the length of the protrusion 40 and intersects the circumferential groove 42 described previously. A lower portion of the upper section 48 has an outer profile corresponding to the inner profile of the upper portion 23 of the cylindrical side wall 18 of the container 4. A rim 36 extends outwardly from a middle portion of the upper section 48. The outer edge of the rim 36 has a wave-like (e.g. sinusoidal) profile when viewed from above corresponding to that of the inner surface of the upper portion 23 of the side wall 18. A pair of handles 38 are formed in opposing sides of the upper section 48, above the level of the rim 36.

Figure 3:
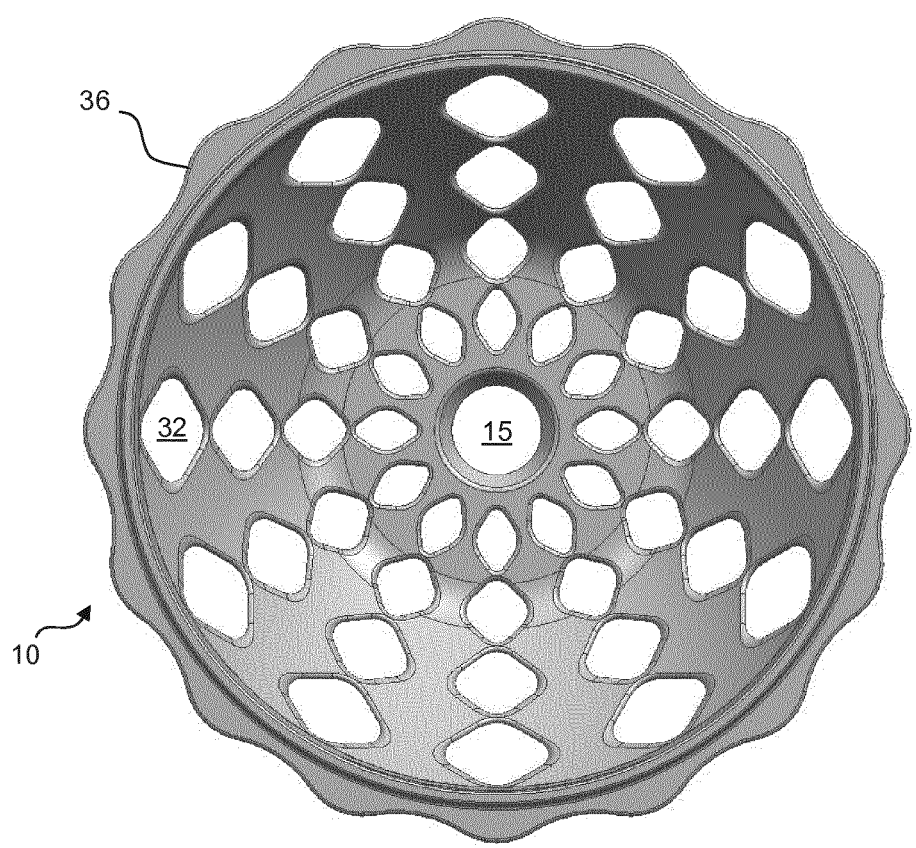
FIG. 3 shows a plan view of the first basket member of FIG. 2, from above.

The first basket member comprises a first set of holes 32 which are provided over the lower and middle sections 44, 46. The arrangement of the holes 32 is best shown in FIG. 3. As shown, the holes 32 are arranged in four concentric circular rows encircling the center of the first basket member 10. Each row comprises twelve equally spaced holes 32. The holes 32 of each row are circumferentially aligned with the holes 32 of adjacent rows, such that the holes 32 radiate out linearly from the center of the first basket member 10. The holes 32 forming each individual row are of the same size. However, the size of the holes 32 increases from the innermost row to the outermost row.

Figure 4:
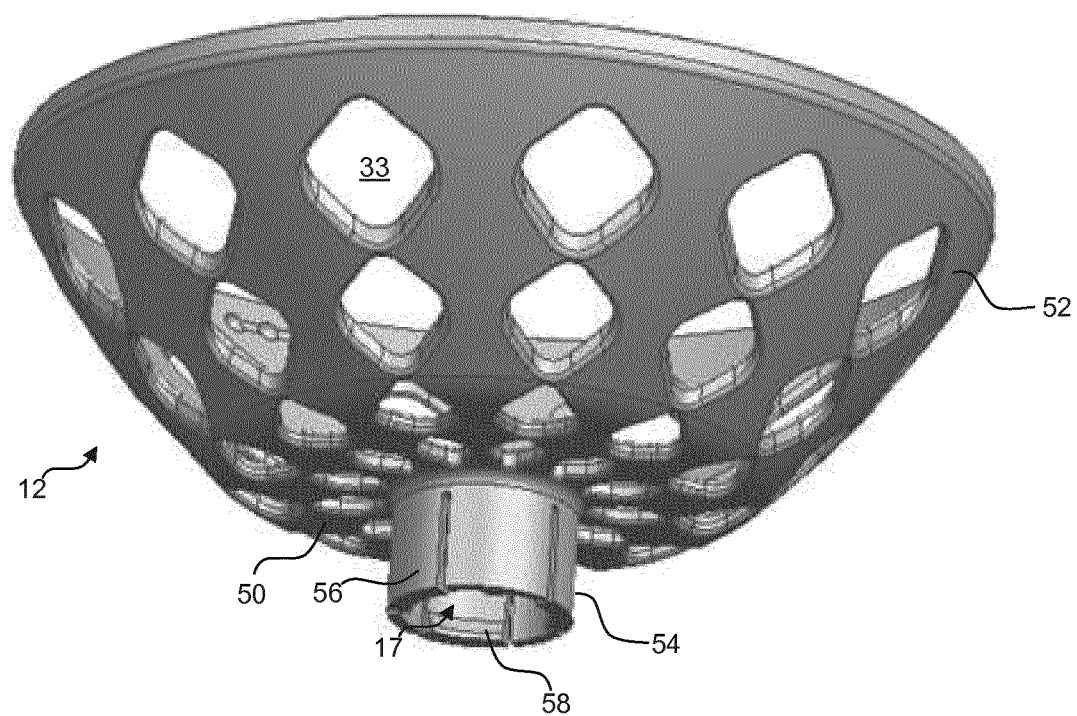
FIG. 4 shows a perspective view of a second basket member of the separation basket.

FIG. 4 shows the second basket member 12 in isolation. As mentioned above and as per the first basket member 10, the second basket member 12 is bowl-shaped. The second basket member 12 comprises a lower section 50 and an upper section 52. The lower section 50 is generally planar, and extends horizontally, as per the lower section 44 of the first basket member 10. The upper section 52 has a generally frusto-conical profile, which extends outwardly in an upward direction from the lower section 50, as per the middle section 46 of the first basket member 10. The maximum diameter of the upper section 52 is less than the maximum diameter of the middle section 46 of the first basket member 10. The lower section 50 comprises a cylindrical protrusion 54 extending from an outer surface of the second basket member 12 at its center, in which the opening 17 is formed. The inner diameter of the opening 17 is greater than the outer diameter of the cylindrical protrusion 40 of the first basket member 10. The cylindrical protrusion 54 is formed by a plurality of, in this instance four, cantilevered tabs 56. Each cantilevered tab 56 comprises a protrusion 58 on its inner surface.

The second basket member 12 comprises a second set of holes 33 which are provided over the lower and upper sections 50, 52. The size, shape and positioning of the holes 33 of the second basket member 12 correspond to the size, shape and positioning of the holes 32 of the first basket member 10.

Figure 5:
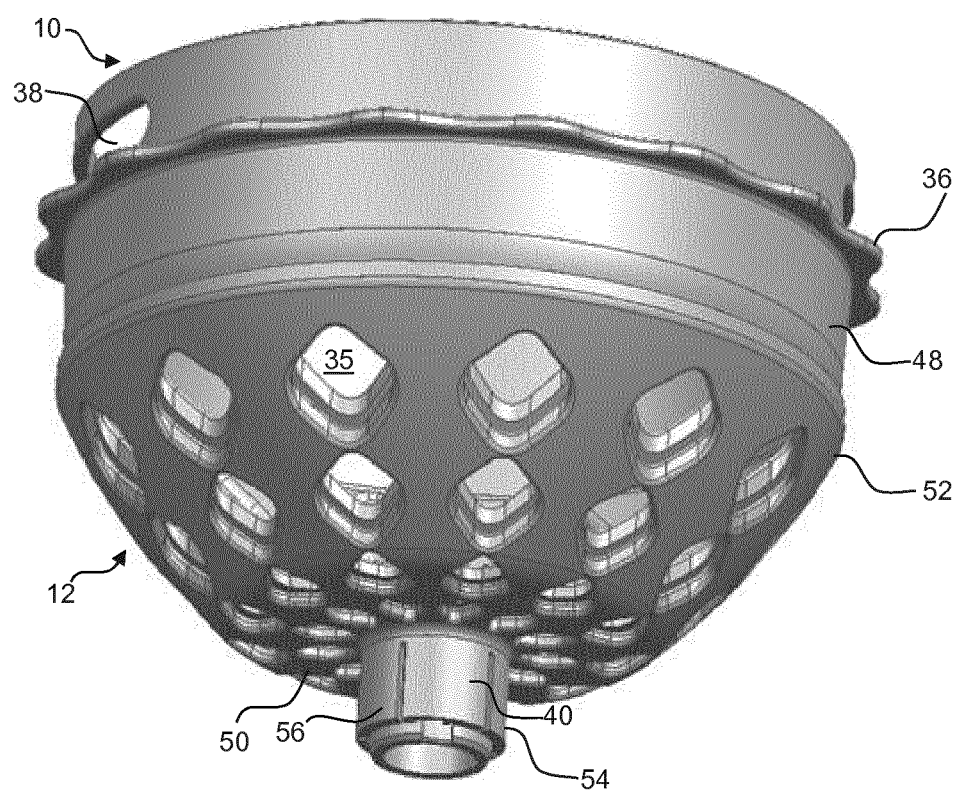
FIG. 5 shows a perspective view of the separation basket with the first and second basket members assembled together.

To assemble the first and second basket members 10, 12 together, they are nested such that the convex outer surface of the first basket member 10 lies against the concave inner surface of the second basket member 12. The cylindrical protrusion 40 of the first basket member 10 is inserted into the opening 17 of the second basket member 12. Once fully inserted, the protrusions 58 of the cantilevered tabs 56 engage with the groove 42 so as to form a snap-fit connection which holds the first and second basket members 10, 12 together. The resulting arrangement is shown in FIG. 5.

The groove 42 is sufficiently wide (in an axial direction) that the protrusions 58 are held loosely within the groove 42 such that the first and second basket members 10, 12 are allowed to rotate relative to one another.

Figure 6:
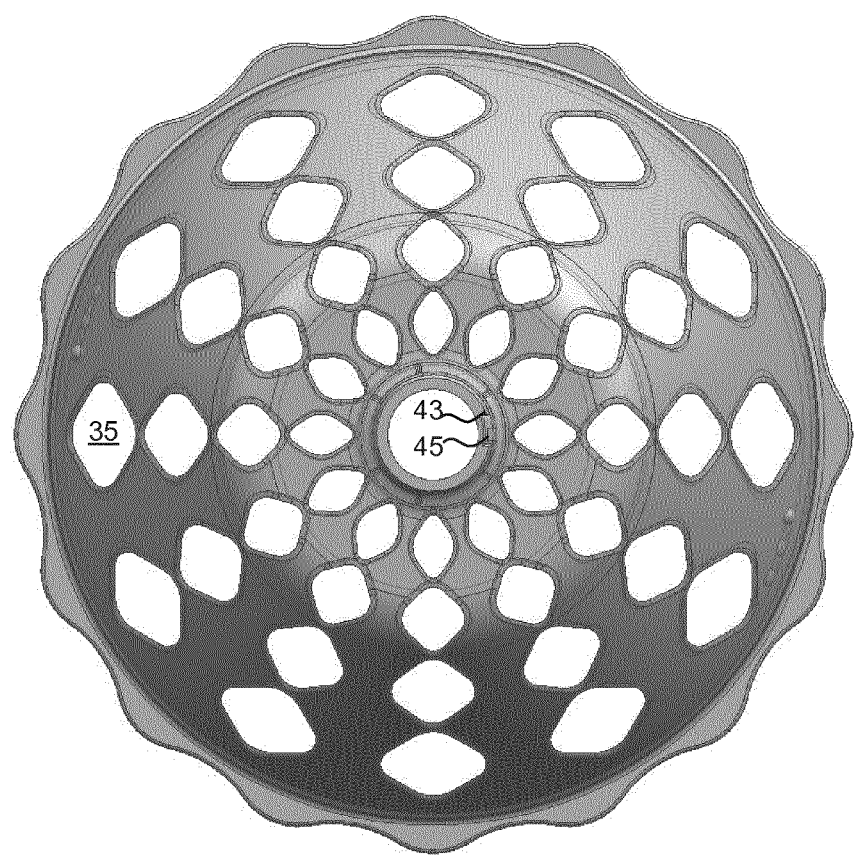
FIG. 6 shows a plan view of the separation basket in a fully-open position, from below.

As shown in FIG. 6, one of the tabs 56 comprises a spline 45 which runs axially along the length of the tab 56. The spline 45 is received within the axial groove 43 of the protrusion 40. The spline 45 is narrower than the width of the axial groove 43 and thus is allowed to move within the groove 43 as the second basket member 12 is rotated relative to the first basket member 10. The interaction of the spline 45 and the axial groove 43 thus restricts the amount of relative rotation between the first and second basket members 10, 12. Specifically, the spline 45 may rotate in an anti-clockwise direction from a fully-open position in which it abuts against a first shoulder of the axial groove 43, as shown in FIG. 6, to a most-closed position in which it abuts against a second shoulder of the axial groove 43.

As shown in FIG. 6, in the fully-open position, the first and second basket members 10, 12 are arranged such that the first and second sets of holes 32, 33 are fully aligned with one another. The separation basket 7 therefore exhibits a plurality of aligned openings 35 which, in this instance, correspond to the holes 32, 33.

Figure 7:
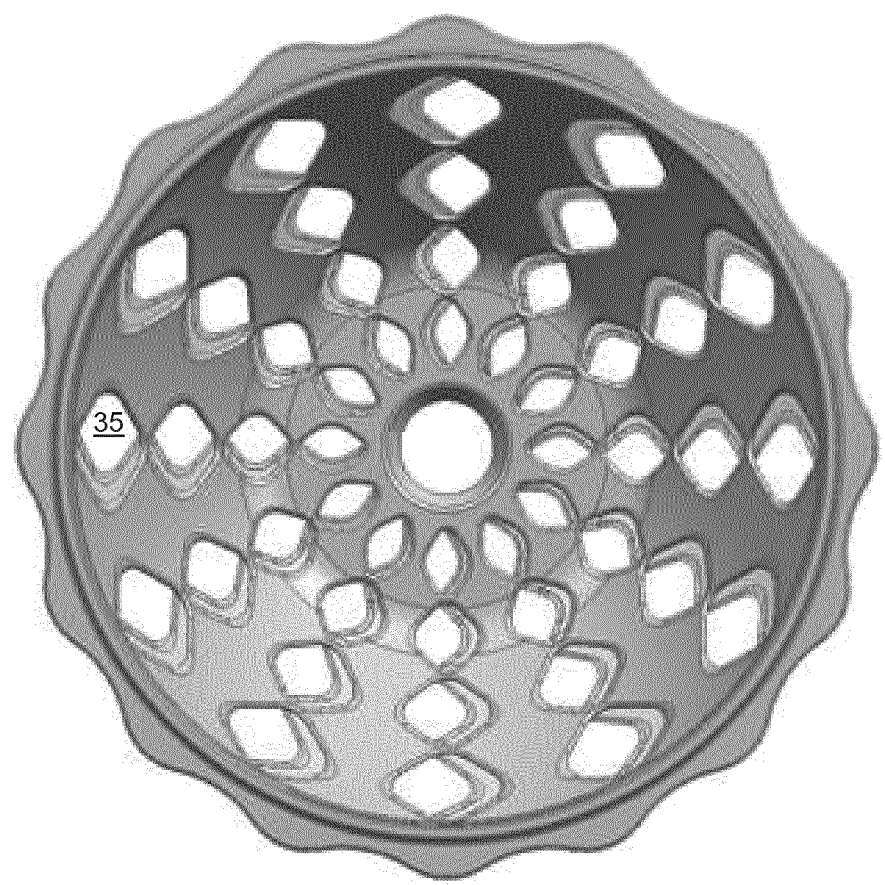
FIG. 7 shows a plan view of the separation basket in a first partially-closed position, from above.
Figure 8:
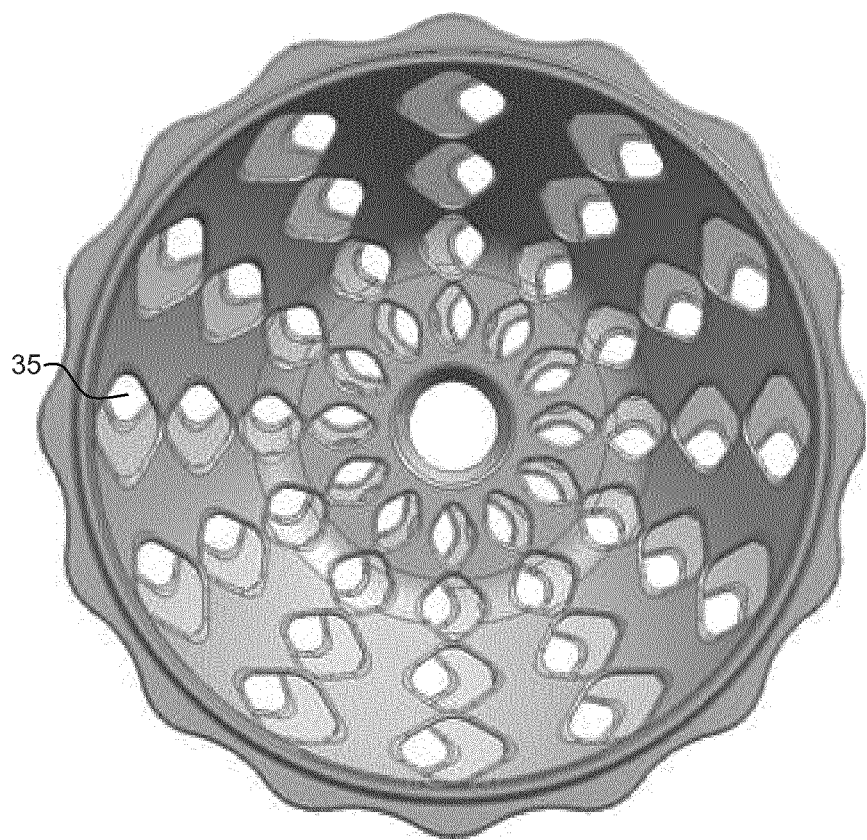
FIG. 8 shows a plan view of the separation basket in a second partially-closed position, from above.
Figure 9:
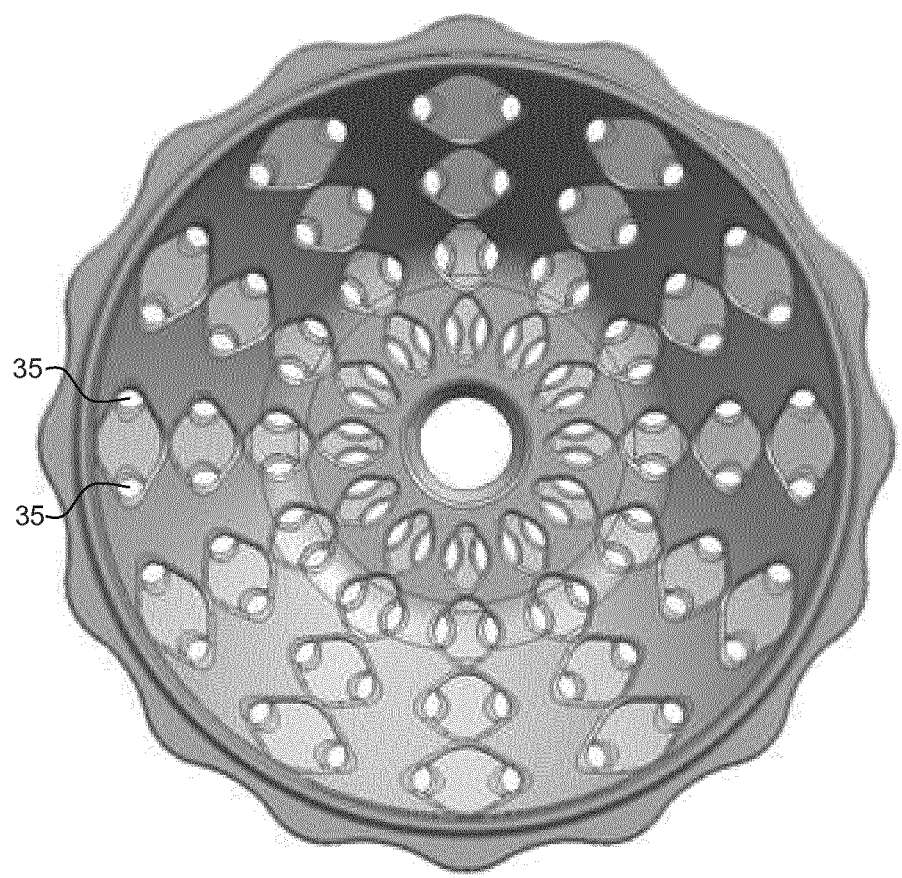
FIG. 9 shows a plan view of the separation basket in a third partially-closed position, from above.

FIGS. 7 to 9 show the transition of the aligned openings 35 during rotation of the first and second basket members 10, 12 from the fully-open position to the most-closed position (see FIG. 9). As shown, as the first and second basket members 10, 12 are rotated relative to one another, the degree of overlap of the first and second sets of holes 32, 33 decreases such that the size (i.e. the cross-sectional area) of the aligned openings 35 decreases. The circumferential spacing between the adjacent holes in each of the first and second sets of holes 32, 33 is such that, in the most-closed position, each hole of the first set of holes 32 bridges two of the holes of the second set of holes 33. As a result, the number of aligned openings 35 doubles when in this position.

The geometry of the holes utilized in the first and second basket members 10, 12 is designed to ensure that the aligned openings 35 maintain a substantially constant aspect ratio during the transition from the fully-open position to the most-closed position. This ensures that the pieces of food which are allowed to pass through the separation basket 7 and are collected in the collection volume 16 are of a uniform size and the level of uniformity is maintained throughout. The aspect ratio may be defined as a ratio of the width to the height of each aligned opening 35 or in terms of a ratio of a minimum bounding circle to a largest inscribed circle (referred to herein as the "circle ratio"). The minimum bounding circle is the smallest circle that the aligned opening 35 is able to fit within, whereas the largest inscribed circle is the largest circle which can be fitted within the interior of the aligned opening 35. The use of such a circle ratio may be considered more appropriate for irregular shapes.

Although an optimal circle ratio of 1 may be achieved for a circular opening, it is not possible to maintain this circle ratio as the first and second basket members 10, 12 are rotated relative to one another. The separation basket 7 instead uses holes which produce aligned openings that are geometrically similar across all positions and so maintain a substantially constant circle ratio.

Figure 10:
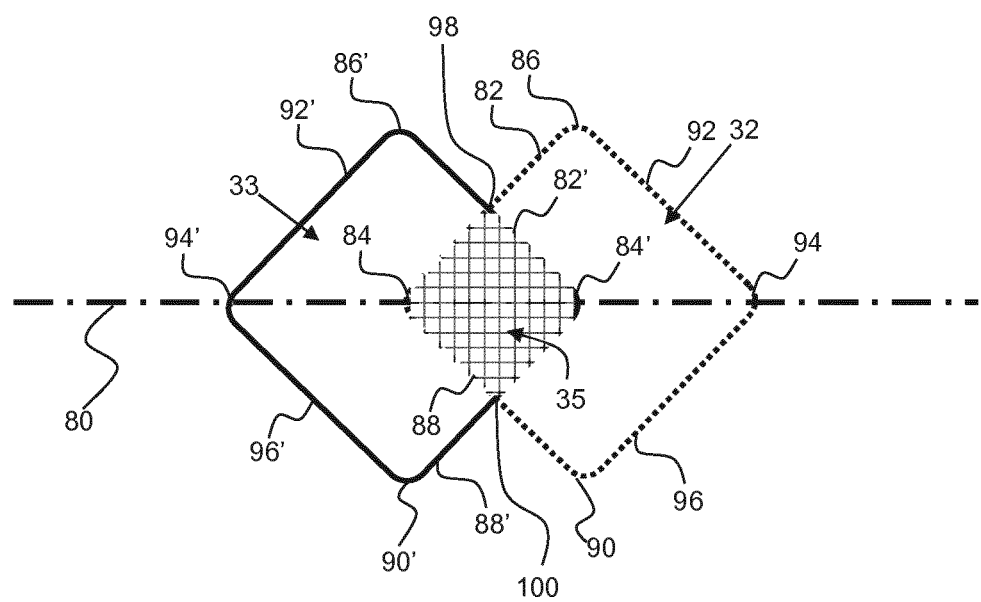
FIG. 10 shows a schematic representation of an aligned opening of the separation basket formed by overlapping holes formed in the first and second separation baskets.

FIG. 10 shows an aligned opening 35 formed by one of the holes of the first set 32 and one of the holes of the second set 33.

As shown, each of the holes 32, 33 is a quadrilateral and, in the present example, is a rhombus, and more specifically a square. The holes 32, 33 are arranged such that two of the vertices of each hole 32, 33 lie on or parallel to a path of movement 80 of the holes 32, 33 about the axis of rotation.

Specifically, the first and second holes 32, 33 each comprise a first side 82, 82' (the labelling of corresponding features between the first and second holes 32, 33 is mirrored here for clarity) extending between a first vertex 84, 84' and a second vertex 86, 86', a second side 88, 88' extending between the first vertex 84 and a third vertex 90, 90' a third side 92, 92' extending between the second vertex 86, 86' and a fourth vertex 94, 94', and a fourth side 96, 96' extending between the third vertex 90, 90' and the fourth vertex 94, 94'. The vertices are formed by rounded corners (which may be beneficial for cleaning), whereas the sides of the holes 32, 33 are substantially straight. The first vertex 84, 84' and the second vertex 94, 94' lie on the path of movement 80. The second vertex 86, 86' and the third vertex 90, 90' are offset from the path of movement 80 and are located either side of the path of movement 80. The vertices each have an angle of 90 degrees such that the sides are each angled at 45 degrees with respect to the path of movement 80.

As shown in FIG. 10, the aligned opening 35 is formed by the overlap between the first and second holes 32, 33. Specifically, the aligned opening 35 is defined by the first vertices 84, 84' of the first and second holes 32, 33 and by portions of the first and second sides 82, 82', 88, 88' which extend from the first vertices 84, 84'. The first sides 82, 82' intersect one another to form a first intersection point 98 and the second sides 88, 88' intersect one another to form a second intersection point 100 (also vertices of the aligned opening 35). The first and second intersection points 98, 100 are located partway along the length of the sides 82, 82', 88, 88' and spaced from any of the vertices of the first and second holes 32, 33. A line drawn between the first and second intersection points 98, 100 is perpendicular to a line drawn between the first vertex 84 of the first hole 32 and the first vertex 84' of the second hole 33. The first and second intersection points 98, 100 are spaced either side of the path of movement 80. The aligned opening 35 therefore is geometrically similar to the holes 32, 33 but is smaller in size. As described previously, the size of the aligned opening 35 may be adjusted by varying the degree of overlap of the holes 32, 33. This action changes the length of the portions of the sides 82, 82', 88, 88' which define the aligned opening 35. As the sides 82, 82', 88, 88' are angled at 45 degrees to the path of movement 80, the vertical extent and horizontal extent of the aligned opening 35 vary in proportion such that a constant aspect ratio or circle ratio is maintained.

To assemble the food processing apparatus 2, the wave-like profile of the outer edge of the rim 36 of the first basket member 10 is aligned with that of the inner surface of the upper portion 23 of the side wall 18 of the container 4. The separation basket 7 is then slid into the container 4 via the opening 11, until the rim 36 of the first basket member 10 abuts the ledge 25 of the container 4. The shaft 6 is passed through the openings 15, 17 of the first and second basket members 10, 12 and the food processing member 8 is attached to the shaft 6 by inserting the shaft 6 into the engagement portion 22.

Food to be processed is inserted into the processing volume 14. The cover 13 is then attached to the separation basket 7 and the drive unit 9 is connected to the container 4. The motor of the drive unit 9 is switched on so as to rotate the power delivery interface 30, which subsequently rotates the shaft 6 and the food processing member 8. As the food processing member 8 rotates its blades 19 cut the food into smaller pieces. Once a piece of food is sufficiently small to pass through one of the aligned openings 35, it passes through the separation basket 7 into the collection volume 16. Once the piece of food is in the collection volume 16, it is no longer subjected to the cutting action of the blades 19 and so remains at the desired size. The drive unit 9, cover 13, food processing member 8 and separation basket 7 can then be detached from the container 4 so as to the allow the processed food to be emptied from the container 4.

As described previously, the relative positions of the first and second basket members 10, 12 may be adjusted in order to vary the size of the aligned openings 35 through the separation basket 7. Accordingly, this enables the size of the food which passes through the separation basket 7 to be controlled. In FIGS. 5 and 6, the first and second basket members 10, 12 are positioned such that the first and second holes 32, 33 are aligned entirely. In this fully-open position, the aligned openings 35 are defined by the entirety of the first and second holes 32, 33. As the first and second basket members 10, 12 are rotated they partially obstruct one another, reducing the degree of overlap of the holes 32, 33 and thus the size of the aligned openings 35.

With the first and second basket members 10, 12 positioned as shown in FIG. 7, the aligned openings 35 are formed by the first vertices 84, 84' and portions (i.e. a subsection of the total length) of the first and second sides 82, 82', 88, 88' of the first and second holes 32, 33. The length of these portions reduce proportionately as the size of the aligned openings 35 decreases, as shown in FIGS. 8 and 9. The shape of the aligned openings 35 at one rotational setting is therefore geometrically similar to the shape of the aligned openings 35 at another rotational setting. The aspect ratio or circle ratio of the aligned openings 35 therefore does not change depending on the relative positions of the first and second baskets members 10, 12. Consequently, the size of the pieces of food passing through the aligned openings 35 can be changed without changing the level of uniformity of the pieces of food which are able to pass through the openings 35 at each setting.

As mentioned previously, the holes are spaced apart from one other such that the distance between the first vertex 84, 84' of one hole and the fourth vertex 94, 94' of an adjacent hole is less than the distance between the first vertex 84, 84' and the fourth vertex 94, 94' of a single hole. Consequently, at the smallest setting shown in FIG. 9, one of the first set of holes 32 will simultaneously form an aligned opening 35 with two adjacent holes of the second set of holes 33, and vice versa. Accordingly, when the aligned openings 35 are sufficiently small, twice the number of aligned openings 35 are formed by the first and second sets of holes 32, 33. This increases the rate at which pieces of food is able to pass through the aligned openings 35.

A suitable range of opening sizes of the aligned openings 35 produces a range of particle sizes between a coarse grade of approximately 12 mm and a fine grade of approximately 2 mm. Different grade ranges are however possible.

The first and second basket members 10, 12 of the separation basket 7 can be easily separated for cleaning by releasing the snap-fit connection therebetween.

Although it has been described that the vertices of the holes are right angled, other angles may be used. Further, it has been described that the holes are four-sided (i.e. quadrilateral); however, this need not be the case and they may instead be triangular. It will be appreciated that they aligned openings and holes have been described as having vertices, even though these corners are curved. Consequently, references to shapes such as square or triangular should be construed broadly.

Although it has been described that the size, shape and positioning of the first set of holes 32 corresponds to the size, shape and positioning of the second set of holes 33, this need not be the case. In particular, it will be appreciated that the certain sides and vertices of the holes may be varied without altering the shape of the aligned opening.

In other arrangements, the separation basket 7 need not be bowl-shaped. For example, it could be planar or have a semi-cylindrical profile. Where a planar separation member or sieve is used, the first and second members may be linearly movable with respect to one other.

The specific arrangement of the holes described with reference to FIG. 3 is merely exemplary. Other arrangements using alternative arrangements of holes (e.g. different numbers of holes, different numbers of rows, different spacing, etc.) are also possible. Further, although it has been described that the size of the holes increases from the innermost row to the outermost row, they may be the same size.

Although it has been described that the first and second basket members 10, 12 can be rotated to any intermediate angle, they may instead be indexed to a number of discrete, fixed angles. The first and second basket members 10, 12 may also be detached and reattached during the transition.

The separation basket 7 may be used with any type of food processor and is not limited to the specific structure described herein. The separation basket 7 may be retrofitted into existing food processors or may even be used as an independent device without a food processor. For example, the separator 7 may be used as a sieve for separating food.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

Although the invention has been described in connection with specific embodiments, it should be understood that various modifications, additions and alterations may be made to the invention by one skilled in the art without departing from the spirit and scope of the invention as defined in the appended claims. Reference signs used in the claims do not limit their scope. The term "comprising" is non-exhaustive and does not exclude other elements or steps. The terms "a" or "an" do not exclude a plurality. Features recited in separate dependent claims may be advantageously combined.

The invention claimed is:

1. A food processing apparatus, comprising:
a container having an interior;
a sieve disposed within the interior of the container and dividing the interior into a processing volume and a collection volume; and
a processing member for processing food disposed within the processing volume;
wherein the sieve comprises:
a first separation member comprising a set of first holes; and
a second separation member adjacent to the first separation member and comprising a set of second holes which are arranged such that the set of second holes overlap the set of first holes to form a plurality of aligned openings which pass through the first and second separation members for allowing food to pass from the processing volume into the collection volume;
wherein the first and second separation members are movable relative to one other between a first position and a second position so as to vary a degree of overlap of the sets of first and second holes and to adjust a cross-sectional area of the aligned openings;
wherein each aligned opening is formed by two sides of one of the first holes and either: one side of one of the second holes, or two sides of one of the second holes;
wherein, in the second position, each aligned opening is defined by portions of each of aforementioned sides of the first and second holes which are shorter than in the first position such that the aligned openings have a smaller cross-sectional area when in the second position than the first position; and
wherein the first and second separation members are configured to maintain a constant aspect ratio of the aligned openings.

2. The food processing apparatus of claim 1, wherein a cross-sectional shape of each aligned opening is geometrically similar in the first and second positions.

3. The food processing apparatus of claim 1, wherein a cross-sectional shape of each aligned opening, at least when in the second position, comprises at least one intersection point formed by an intersection of two sides of the first and second holes partway along their length.

4. The food processing apparatus of claim 3, wherein the intersecting sides of the first and second holes are each angled away from a path of movement of the first hole relative to the second hole.

5. The food processing apparatus of claim 1, wherein each aligned opening has a quadrilateral cross-sectional shape, and wherein said two sides of the first hole meet at a first vertex and said two sides of the second hole meet at a second vertex, the first and second vertices lying on or parallel to a path of movement of the first hole relative to the second hole.

6. The food processing apparatus of claim 5, wherein each of the two sides of the first hole intersect with each of the two sides of the second hole to form first and second intersection points.

7. The food processing apparatus of claim 6, wherein a line drawn between the first and second intersection points is perpendicular to a line drawn between the first and second vertices, and wherein the first and second intersection points are spaced either side of the path of movement.

8. The food processing apparatus of claim 1, wherein the width of the first holes is greater than a spacing between adjacent second holes such that each first hole can bridge a pair of adjacent second holes to form a pair of aligned openings.

9. The food processing apparatus of claim 1, wherein the first and/or second holes are reflectionally symmetric about an axis of symmetry which is perpendicular to a path of movement of the first hole relative to the second hole.

10. The food processing apparatus of claim 1, wherein the first and/or second holes are reflectionally symmetric about an axis of symmetry which lies on a path of movement of the first hole relative to the second hole.

11. The food processing apparatus of claim 1, wherein the first and second holes have a same cross-sectional shape.

12. The food processing apparatus of claim 1, wherein the first separation member and the second separation member are bowl shaped, and wherein the first separation member and the second separation member are rotatable relative to one another about an axis of rotation.

13. The food processing apparatus of claim 1, wherein the first separation member and the second separation member are rotatably coupled to one another at their centers.

14. The food processing apparatus of claim 13, wherein the first and second separation members are rotatably coupled via a snap-fit connection.

15. A sieve for a food processing apparatus, the sieve comprising:
a first separation member comprising a set of first holes; and
a second separation member adjacent to the first separation member and comprising a set of second holes which are arranged such that the set of second holes overlap the set of first holes to form a plurality of aligned openings which pass through the first and second separation members for allowing food to pass through the sieve;
wherein the first and second separation members are movable relative to one other between a first position and a second position so as to vary a degree of overlap of the sets of first and second holes and to adjust a cross-sectional area of the aligned openings;
wherein each aligned opening is formed by two sides of one of the first holes and either: one side of one of the second holes, or two sides of one of the second holes;
wherein, in the second position, each aligned opening is defined by portions of each of said sides of the first and second holes which are shorter than in the first position such that the aligned openings have a smaller cross-sectional area when in the second position than the first position; and
wherein the first and second separation members are configured to maintain a constant aspect ratio of the aligned openings.

16. The food processing apparatus of claim 1, wherein the aspect ratio of each of the aligned openings is defined as a ratio of the width to the height of each aligned opening.

17. The food processing apparatus of claim 1, wherein the aspect ratio of each of the aligned openings is defined as a ratio of a minimum bounding circle to a largest inscribed circle, wherein the minimum bounding circle is the smallest circle that the aligned opening is able to fit within, and wherein the largest inscribed circle is the largest circle which can be fitted within the interior of the aligned opening.

18. The food processing apparatus of claim 1, wherein each aligned opening formed by two sides of one of the first holes and either: one side of one of the second holes defines a triangular cross-sectional shape, or two sides of one of the second holes defines a quadrilateral cross-sectional shape.

* * * * *